United States Patent
Tanabe et al.

(10) Patent No.: US 11,084,534 B2
(45) Date of Patent: Aug. 10, 2021

(54) VEHICLE BODY FRONT STRUCTURE (71) Applicant: HONDA MOTOR CO., LTD., Tokyo (JP)

(72) Inventors: Shinya Tanabe, Wako (JP); Takafumi Miki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 16/564,878

(22) Filed: Sep. 9, 2019

(65) Prior Publication Data

US 2020/0094879 A1 Mar. 26, 2020

(30) Foreign Application Priority Data

Sep. 26, 2018 (JP) .............................. JP2018-179733

(51) Int. Cl.
*B60R 11/04* (2006.01)
*B62D 25/08* (2006.01)
(Continued)

(52) U.S. Cl.
CPC .............. *B62D 25/08* (2013.01); *B60K 11/04* (2013.01); *B60R 19/18* (2013.01); *B60Q 1/0408* (2013.01);
(Continued)

(58) Field of Classification Search
CPC ...... H01Q 1/3233; H01Q 1/3283; H01Q 1/42; G01S 2013/93275; G01S 2013/93271;
(Continued)

(56) References Cited

U.S. PATENT DOCUMENTS 5,682,168 A * 10/1997 James .................. H01Q 1/3275
343/711
6,020,844 A * 2/2000 Bai ....................... G01S 7/4026
342/147

(Continued)

FOREIGN PATENT DOCUMENTS

JP     2002211337 A    7/2002
JP     200713115 A     5/2007

(Continued)

OTHER PUBLICATIONS

Hsu, Ben; NEWS: Honda's retro electric Civic confirmed for production, Sep. 12, 2017, JapaneseNostalgicCar.com,http://japanesenostalgiccar.com/frankfurt-motor-show-honda-urban-ev-1st-gen-civic-concept/; retrieved Jan. 1, 2021 (Year: 2017).*

(Continued)

*Primary Examiner* — Steve Clemmons
(74) *Attorney, Agent, or Firm* — Armstrong Teasdale LLP (57) ABSTRACT

A vehicle body front structure, including a front bumper face positioned in front of a front bumper beam, and an ornamental front panel located above the front bumper face; wherein the front panel includes at least a substantially vertically extending vertical surface and an inclined surface continuous with the vertical surface, and the inclined surface is provided with a transmitting member configured to transmit radio wave or light, a radar device or an image capturing device being positioned behind the transmitting member.

9 Claims, 7 Drawing Sheets

(51) Int. Cl.
    *B60R 19/18*     (2006.01)
    *B60K 11/04*     (2006.01)
    *B60R 13/10*     (2006.01)
    *B60Q 1/04*     (2006.01)
    *B60R 13/00*     (2006.01)

(52) U.S. Cl.
CPC ............. *B60R 11/04* (2013.01); *B60R 13/005* (2013.01); *B60R 13/105* (2013.01); *B60R 2019/186* (2013.01); *B60R 2019/1886* (2013.01); *B60Y 2200/91* (2013.01)

(58) Field of Classification Search
CPC .... G01S 13/931; G01S 13/867; G01S 7/4813; B60R 19/18; B60R 11/04; B60R 2019/1886; B62D 25/08; B60Y 2200/91
USPC .................................................. D12/93, 169
See application file for complete search history.

(56) References Cited

U.S. PATENT DOCUMENTS

| | | | |
|---|---|---|---|
| 6,496,138 B1 * | 12/2002 | Honma | H01Q 1/42 342/70 |
| 6,659,220 B2 | 12/2003 | Kobayashi | |
| 7,009,551 B1 * | 3/2006 | Sapletal | G01S 7/481 342/70 |
| 9,187,820 B2 * | 11/2015 | Kawaguchi | C23C 14/205 |
| 9,812,787 B2 * | 11/2017 | Binzer | G01S 13/931 |
| 9,828,036 B2 * | 11/2017 | Frayer | H01Q 1/42 |
| 9,995,822 B2 * | 6/2018 | Baftiu | H01Q 17/00 |
| 10,793,095 B2 * | 10/2020 | Horiuchi | B60R 21/00 |
| 2014/0062114 A1 | 3/2014 | Gaboury | B60R 13/005 296/1.08 |
| 2014/0091969 A1 * | 4/2014 | Shi | H01Q 1/421 342/385 |
| 2014/0111370 A1 * | 4/2014 | Aleem | B60R 19/483 342/70 |
| 2014/0247349 A1 * | 9/2014 | Heard | H04N 7/18 348/148 |
| 2016/0090127 A1 * | 3/2016 | Park | B60R 19/24 296/193.09 |
| 2016/0137230 A1 * | 5/2016 | Taneda | G01S 13/931 296/193.09 |
| 2016/0231417 A1 * | 8/2016 | Aoki | G01S 7/032 |
| 2016/0291151 A1 * | 10/2016 | Dechoux | B60R 19/483 |
| 2017/0222311 A1 * | 8/2017 | Hess | G01S 7/02 |
| 2017/0259754 A1 * | 9/2017 | Gong | G09F 21/04 |
| 2018/0131099 A1 * | 5/2018 | Geary | G01S 13/931 |
| 2018/0290612 A1 * | 10/2018 | Ikeno | B60R 19/023 |
| 2018/0301795 A1 * | 10/2018 | Lopez, Jr. | H01Q 1/3233 |
| 2018/0348362 A1 * | 12/2018 | Callewaert | H01Q 1/3233 |
| 2019/0195986 A1 * | 6/2019 | Hellinger | G01S 7/032 |
| 2019/0198986 A1 * | 6/2019 | Singh | H01Q 1/3233 |
| 2019/0377061 A1 * | 12/2019 | Kobayashi | G01S 7/03 |
| 2020/0011989 A1 * | 1/2020 | Takahashi | G01S 13/86 |
| 2020/0247307 A1 * | 8/2020 | Tsutsumi | B60R 11/04 |
| 2020/0300964 A1 * | 9/2020 | Kasaba | G01S 7/4813 |
| 2020/0339053 A1 * | 10/2020 | Bicego | H01Q 1/42 |

FOREIGN PATENT DOCUMENTS

| | | |
|---|---|---|
| JP | 2007131155 A | 5/2007 |
| JP | 6119771 B2 | 4/2017 |
| JP | 2018111367 A | 7/2018 |

OTHER PUBLICATIONS

JPO Notice of Reasons for Refusal for Japanese Patent Application No. 2018179732 drafted Mar. 17, 2020, with English translation; 8 pp.
JPO Notice of Reasons for Refusal for Japanese Patent Application No. 2018179732 drafted Aug. 18, 2020, with English translation; 8 pp.
JPO Decision to Grant a Patent for Japanese Patent Application No. 2018179732 drafted Oct. 14 2020, with English translation; 5 pp.
JPO Notice of Reasons for Refusal for Japanese Patent Application No. 2018179733 drafted Aug. 13, 2020; 8 pp.
JPO Notice of Reasons for Refusal for JP Application No. 2018-179733; 8 pages.

* cited by examiner

VEHICLE BODY FRONT STRUCTURE

TECHNICAL FIELD

The present invention relates to a vehicle body front structure including an ornamental front panel provided with a light/radio wave transmitting member which is positioned above a front bumper face.

BACKGROUND ART

In a known vehicle body front structure, a front bumper face is provided with a grille part, and a radio wave transmitting member is provided in the grille part to place a radar device behind the radio wave transmitting member. See JP6119771B2. According to this arrangement, the radar device is concealed from view so that the external appearance of the vehicle is prevented from being impaired.

In some vehicles, in particular electric vehicles, the front bumper face is not provided with a sizable grille part because of the reduced need for cooling. In such cases, a front panel may be provided in a front part of the vehicle which has traditionally been occupied by a front grille. When a radio wave transmitting member is provided in a part of the front panel, an external appearance may be impaired because the radio wave transmitting member is made of a material different from that of the surrounding part of the front panel. A light transmitting member may also be provided in the front panel for placing an optical image capturing device, and this may also impair the external appearance of the vehicle front part.

SUMMARY OF THE INVENTION

In view of such a problem of the prior art, a primary object of the present invention is to provide a vehicle body front structure which is provided with a transmitting member, and can provide a favorable external appearance.

To achieve such an object, the present invention provides a vehicle body front structure, comprising: a front bumper face (14) positioned in front of a front bumper beam (50); and an ornamental front panel (16) located above the front bumper face, wherein the front panel includes at least a substantially vertically extending vertical surface (36) and an inclined surface (37) continuous with the vertical surface, and the inclined surface is provided with a transmitting member (33, 34) configured to transmit radio wave or light, a radar device (70) or an image capturing device (72) being positioned behind the transmitting member.

The front panel improves the external appearance of the front end of the vehicle by being positioned in a relatively elevated part thereof. Since the vertical surface and the inclined surface have different reflective properties, the vertical surface and the inclined surface cause different visual impressions, and this improves the external appearance of the front panel. Furthermore, any foreign matter such as moisture and snow that may deposit on the inclined surface has a tendency to be quickly removed owing to the slanting of the inclined surface, and therefore, the impairment of the performance of the radar device or the image capturing device positioned behind the transmitting member can be avoided.

Preferably, the vertical surface is positioned in an upper part of the front panel, and the inclined surface inclines forward toward a lower edge thereof, the transmitting member includes a radio wave transmitting member (33) to transmit radio wave, and the vertical surface is provided with a light transmitting member (34) to transmit light, the radar device being positioned behind the radio wave transmitting member, the image capturing device being position behind the light transmitting member.

Since the image capturing device is positioned behind the vertical surface, the road surface immediately in front of the vehicle can be captured by the image capturing device. Even when the radar device is positioned behind the inclined surface, a wide detection range can be ensured.

Preferably, an upper edge of the radio wave transmitting member (33) is located at a lower edge of the vertical surface.

Since the upper edge of the radio wave transmitting member is located at the boundary between the vertical surface and the inclined surface, the presence of the radio wave transmitting member can be made relatively inconspicuous.

Preferably, a part of the vertical surface located between the light transmitting member and the radio wave transmitting member is fitted with an emblem (32).

Thereby, owing to the presence of the emblem, the light transmitting member and the radio wave transmitting member can be made relatively inconspicuous.

Preferably, the vehicle body front structure further comprises a safety plate (58) attached to a front side of the front bumper beam (50), and positioned behind the front bumper face to absorb an impact of a frontal collision, and a lower edge of the front panel is positioned rearward of a front end of the safety plate.

At the time of a light frontal collision, the impact can be absorbed by the safety plate so that the damage to the front panel can be minimized.

Preferably, a lower edge of the transmitting member (33, 34) is positioned rearward of the front end of the safety plate.

At the time of a light frontal collision, the impact can be absorbed by the safety plate so that the damage to the transmitting member can be minimized.

Preferably, a license plate mounting surface (41A) is provided on the front bumper face, and a lower edge of the front panel is located rearward of the license plate mounting surface.

Thereby, at the time of a light frontal collision, the impact can be absorbed by the license plate mounting surface so that the damage to the front panel can be minimized.

Preferably, an external air introduction opening (28) is defined in the front bumper face, the vehicle body front structure further comprising a heat exchanger (60) positioned rearward of the front bumper beam, and an air guide member (64) configured to conduct external air introduced from the external air introduction opening to the heat exchanger.

Thus, the external air introduction opening can be provided in a lower part of the front end of the vehicle body which is relatively inconspicuous, but the guide member allows the external air introduced from the external air introduction opening to be favorably guided by the air guide member. Thus, an external appearance of the front end of the vehicle can be ensured without compromising the performance in cooling the heating exchanger.

Preferably, the front bumper face is provided with a license plate mounting portion (24), and a lower edge of a license plate mounted to the license plate mounting portion is located above an upper edge of the external air introduction opening.

Thereby, the license plate does not obstruct the air flow into the external air introduction opening.

Preferably, a front end of the air guide member (64) is located rearward of a front end of the safety plate (58).

Thereby, at the time of a light frontal collision, the impact can be absorbed by the license plate mounting surface so that the damage to the air guide member and the parts associated therewith can be minimized.

Thus, the present invention provides a vehicle body front structure which can provide a favorable external appearance.

DESCRIPTION OF THE PREFERRED EMBODIMENT(S)

A preferred embodiment of the present invention is described in the following with reference to the appended drawings.

Figure 1:
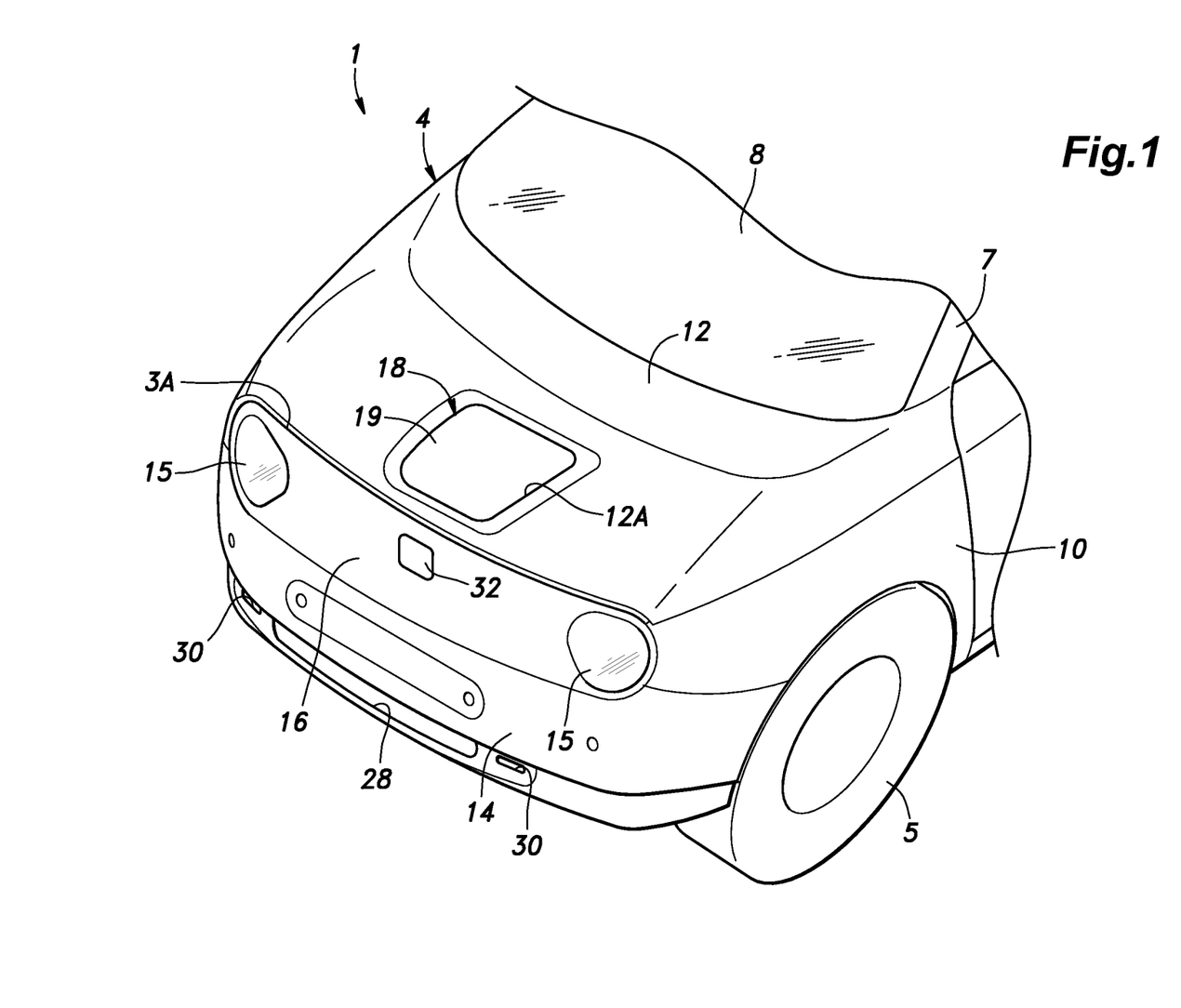
FIG. 1 is a front perspective view of a vehicle body front structure of an electric vehicle according to an embodiment of the present invention.

FIG. 1 is a perspective view of a front part of a vehicle body 4 of an electric vehicle 1 according to an embodiment of the present invention. As shown in FIG. 1, the vehicle body 4 of the electric vehicle 1 defines a cabin and a front space 3 located in front of the cabin, and is fitted with a pair of front wheels, and a pair of rear wheels (not shown in the drawings). The vehicle body 4 includes a pair of front pillars 7, and a front windshield 8 is provided between the front pillars 7. The vehicle body 4 further includes a pair of front fenders 10 extending in the fore and aft direction on either side of the front space 3, and a front hood 12 configured to selectively cover a front space opening 3A defining an upper end of the front space 3.

The front ends of the front fenders 10 are connected to a bumper beam 50 (FIG. 4) which is covered by a front bumper face 14 on the front side thereof. A front panel 16 is attached to the vehicle body 4 so as to be positioned immediately above the bumper face 14 so as to create a pleasing front view of the vehicle in cooperation with the front bumper face 14. The front panel 16 is formed with a pair of circular openings 31, and a pair of headlights 15 are positioned behind the front panel 16 so as to face the respective circular openings 31 from behind the front panel 13. The front end of the front space opening 3A is defined by the front panel 16, and the rear end of the front space opening 3A is defined by the dashboard (bulkhead) that separates the cabin and the front space 3 from each other. The front bumper face 14 and the front panel 16 jointly form a cover face member that covers the structural members of the vehicle body 4 from the front.

The fenders 10, the front hood 12, and the structural members of the vehicle body 4 are generally made of stamp formed sheet steel. The front bumper face 14 and the front panel 16 are made of injection molded plastic members.

The front hood 12 is hinged to a structural member of the vehicle body 4 via a hinge at the rear end so as to selectively close the front space opening 3A. A port opening 12A for permitting access to a port device 18 is provided in a front part of the front hood 12. A port device 18 is fixed to a structural member of the vehicle body 4 so as to face the front space opening 3A. The port device 18 includes a plurality of electric connectors for charging electric power to an onboard battery unit, and delivering electric power from the onboard battery unit to an external user. The port device 18 is provided with a lid 19 that normally closes the port device 18, but can be selectively opened so as to permit access to the port device 18. The lid 19 of the port device 18 is generally flush with the upper surface of the front hood 12 when the front hood 12 is closed. The lid 19 of the port device 18 can be opened and closed regardless of whether the front hood 12 is open or closed.

Figure 2:
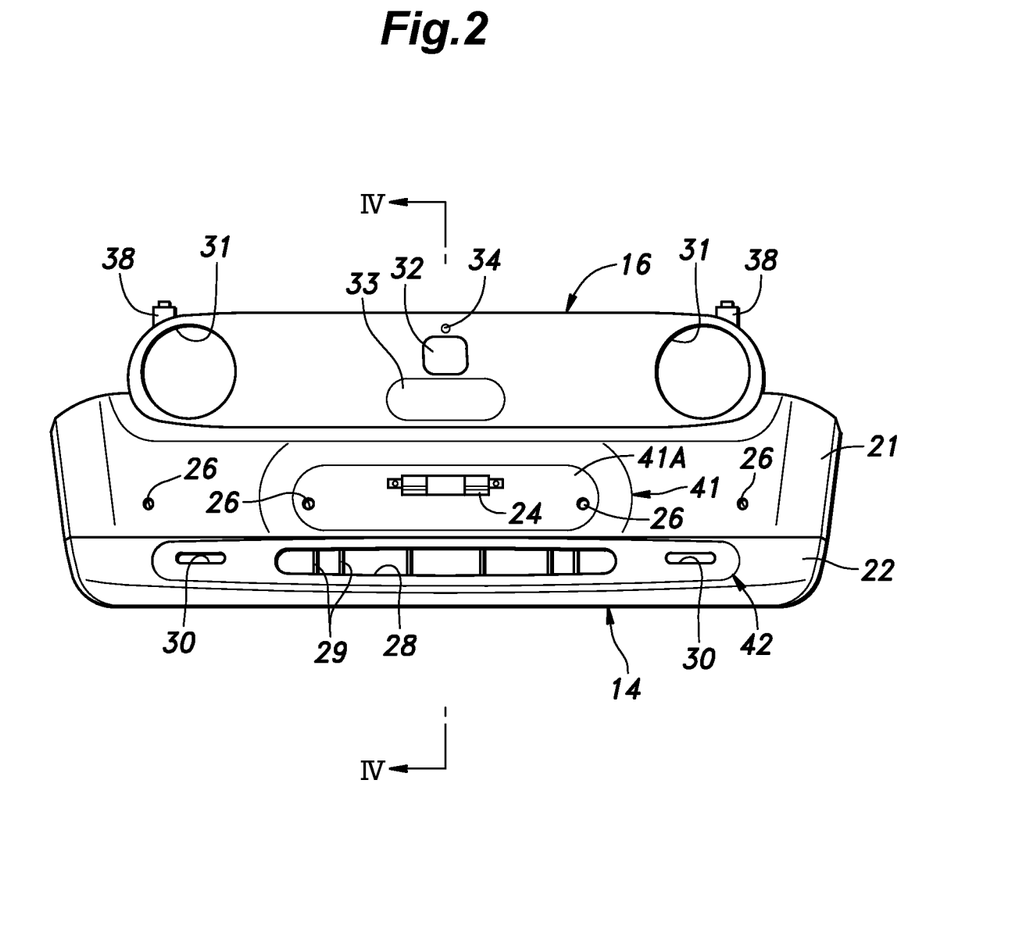
FIG. 2 is a front view of a front panel and a front bumper face provided on a front end of the vehicle.

FIG. 2 is a front view of the front bumper face 14 and the front panel 16. As shown in FIG. 2, the front bumper face 14 consists of two parts, an upper face member 21 and a lower face member 22 positioned one above the other substantially without any gap defined therebetween. The upper face member 21 and the lower face member 22 are separated by a generally horizontal dividing surface, and have a substantially same lateral dimension, while the upper face member 21 has a substantially greater vertical dimension than the lower face member 22. In the illustrated embodiment, the lower edge of the upper face member 21 is formed with a groove facing forward, and the upper edge of the lower face member 22 is formed with a flange extending rearward, and fitted into the groove so as to join the upper face member 21 and the lower face member 22 together.

A license plate mounting portion 24 for attaching a license plate 74 is provided in a central part of the front surface of the upper face member 21. The license plate mounting portion 24 is provided in a somewhat upper part of the upper face member 21 to support an upper part of the license plate 74 (see FIG. 5). A plurality of sensor mounting holes 26 are provided along an imaginary line extending horizontally slightly below the license plate mounting portion 24 at a regular interval in the lateral direction. In the present embodiment, four sensor mounting holes 26 are provided, two on the right side of the license plate mounting portion 24 and the other two on the left side of the license plate mounting portion 24. Each sensor attachment hole 26 is provided with an object sensor 76 which is attached to the rear side of the upper face member 21 so as to face the corresponding sensor mounting hole 26.

A laterally elongated external air introduction opening 28 is formed in a laterally central part of the lower face member 22 to introduce external air into the front space 3. The lower face member 22 is provided with a plurality of vertical bars 29 extending vertically across the external air introduction opening 28. As a result, the lower face member 22 may appear as a grille which is typically provided in more conventional vehicles powered by internal combustion engines. A pair of openings are provided on either side of the external air introduction opening 28 to serve as fog light mounting holes 30 for mounting fog lights (not shown in the drawings).

The front panel 16 has a laterally elongated track shape, and is provided with the headlights 15 as mentioned earlier. A central part of the front panel 16 is fitted with an emblem 32 (mark), and a radio wave transmitting member 33 for transmitting radio waves is provided immediately under the emblem 32. The radio wave transmitting member 33 in this embodiment consists of a plate member fitted into an opening in the front panel 16. The radio wave transmitting member 33 is rectangular in shape, and is made of material having a relatively high transmissivity for radio wave. Thus, the emblem 32 is disposed in an upper part of the front panel 16, and the radio wave transmitting member 33 is disposed in a lower area of the front panel 16. The emblem 32 consists of a substantially rectangular member attached to the front surface of the front panel 16 by bonding, fitting or the like whereas the radio wave transmitting member 33 is fitted in a through hole formed in the front panel 16.

Further, a circular light transmitting member 34 for transmitting light is provided in a part of the front panel 16 located directly above the emblem 32. The light transmitting member 34 is a transparent or semi-transparent plate member or lens fitted in an opening formed in the front panel 16, and is typically smaller than the emblem 32 and the radio wave transmitting member 33. Alternatively, the front panel 16 may be made of at least locally transparent or semi-transparent material, and the light transmitting member 34 may consist of a transparent part of the front panel 16. Further, the light transmitting member 34 may also be positioned under the emblem 32 while the radio wave transmitting member 33 is positioned above the emblem 32. Alternatively or additionally, a LIDAR device may be provided behind the light transmitting member 34.

Figure 3:
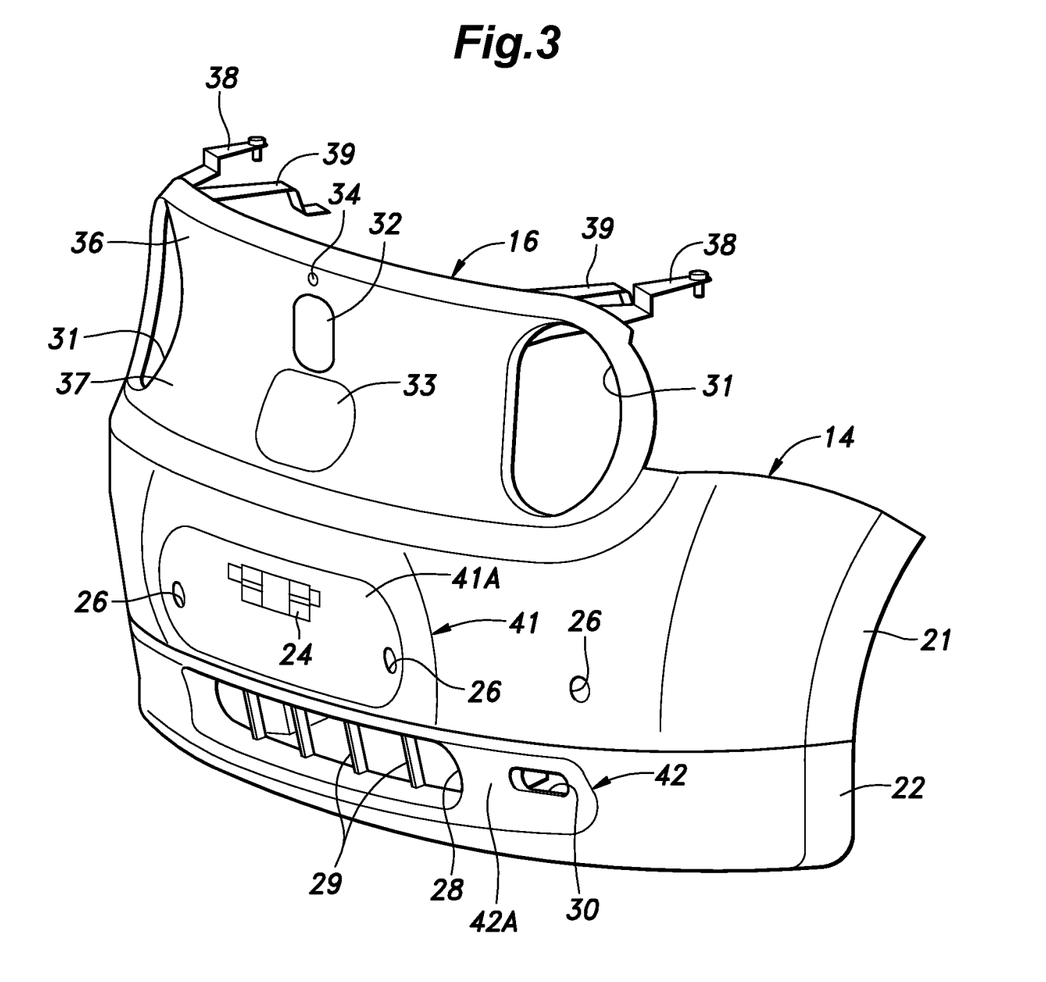
FIG. 3 is a perspective view of the front panel and the front bumper face.

FIG. 3 is a perspective view of the front bumper face 14 and the front panel 16. As shown in FIG. 3, the front bumper face 14 and the front panel 16 have a curved shape such that the laterally central part thereof protrudes forward, and the left and right end parts thereof are inclined so as to be positioned rearward toward the respective lateral ends thereof. In other words, the front bumper face 14 and the front panel 16 present a generally convex surface facing forward in plan view.

The front panel 16 has an upper vertical surface 36 extending substantially vertically in an upper part thereof, and a lower inclined surface 37 continuous to the lower edge of the upper vertical surface 36 and inclined forward toward the lower end thereof. In the illustrated embodiment, the front panel 16 presents a generally concave surface toward the front except for the peripheral part thereof which is bent rearward and extends substantially linearly in cross sectional view.

The radio wave transmitting member 33 is positioned on the lower inclined surface 37, and the emblem 32 is positioned on the upper vertical surface 36. Since the radio wave transmitting member 33 is provided on the lower inclined surface 37 which reflects incoming light in a different direction from the upper vertical surface 36, the radio wave transmitting member 33 is less noticeable as compared to the case where the emblem 32 and the radio wave transmitting member 33 are located in a same plane or on a flat surface. In the illustrated embodiment, the upper vertical surface 36 and the lower inclined surface 37 are defined by a common arcuate surface in side view. In an alternate embodiment, the upper vertical surface 36 and the lower inclined surface 37 are defined by planar surfaces connected by a horizontal line, preferably rounded at the junction between upper vertical surface 36 and the lower inclined surface 37 in side view.

A pair of outer attachment pieces 38 extend substantially rearward from either upper outboard end part of the front panel 16. Each outer attachment piece 38 is bent in a stepwise manner so that the free end thereof extends rearward in an upwardly offset relationship to the base end thereof. A pair of inner attachment pieces 39 extend substantially rearward from either upper outboard end part of the front panel 16 which is somewhat more inboard than the upper outboard end part from which the corresponding outer attachment piece 38 extends. Each inner attachment piece 39 is bent in a stepwise manner so that the free end thereof extends rearward in a downwardly offset relationship to the base end thereof.

A central part of the front face of the upper face member 21 is provided with a laterally elongated substantially oval shallow recess 41 is formed. The license plate mounting portion 24 is position in the laterally central part of the recess 41 or in the bottom surface 41A of the recess 41. In the illustrated embodiment, the license plate mounting portion 24 is located in a vertically upper part of the recess 41. Thus, the bottom surface 41A of the recess 41 serves as a license plate mounting surface. Of the four sensor mounting holes 26, the two sensor mounting holes 26 in the laterally central part of the upper face member 21 are position in lateral end parts of the recess 41, respectively.

An annular region of the lower face member 22 surrounding the external air introduction opening 28 is formed as an annular recess 42 which is recessed in the rearward direction. The annular recess 42 is formed in such a manner that the surface of the annular recess 42 is generally slanted rearward toward the external air introduction opening 28. Therefore, the annular recess 42 provides an aerodynamically favorable contour for the air flowing into the external air introduction opening 28.

The two fog light mounting holes 30 are positioned on the left and right end parts of the bottom surface 42A of the annular recess 42, respectively. Since the fog light mounting holes 30 are provided in a slightly recessed part of the front bumper face 14, damage to the fog lights at the time of a light front collision can be prevented without limiting the irradiation range of the fog lights.

Figure 4:
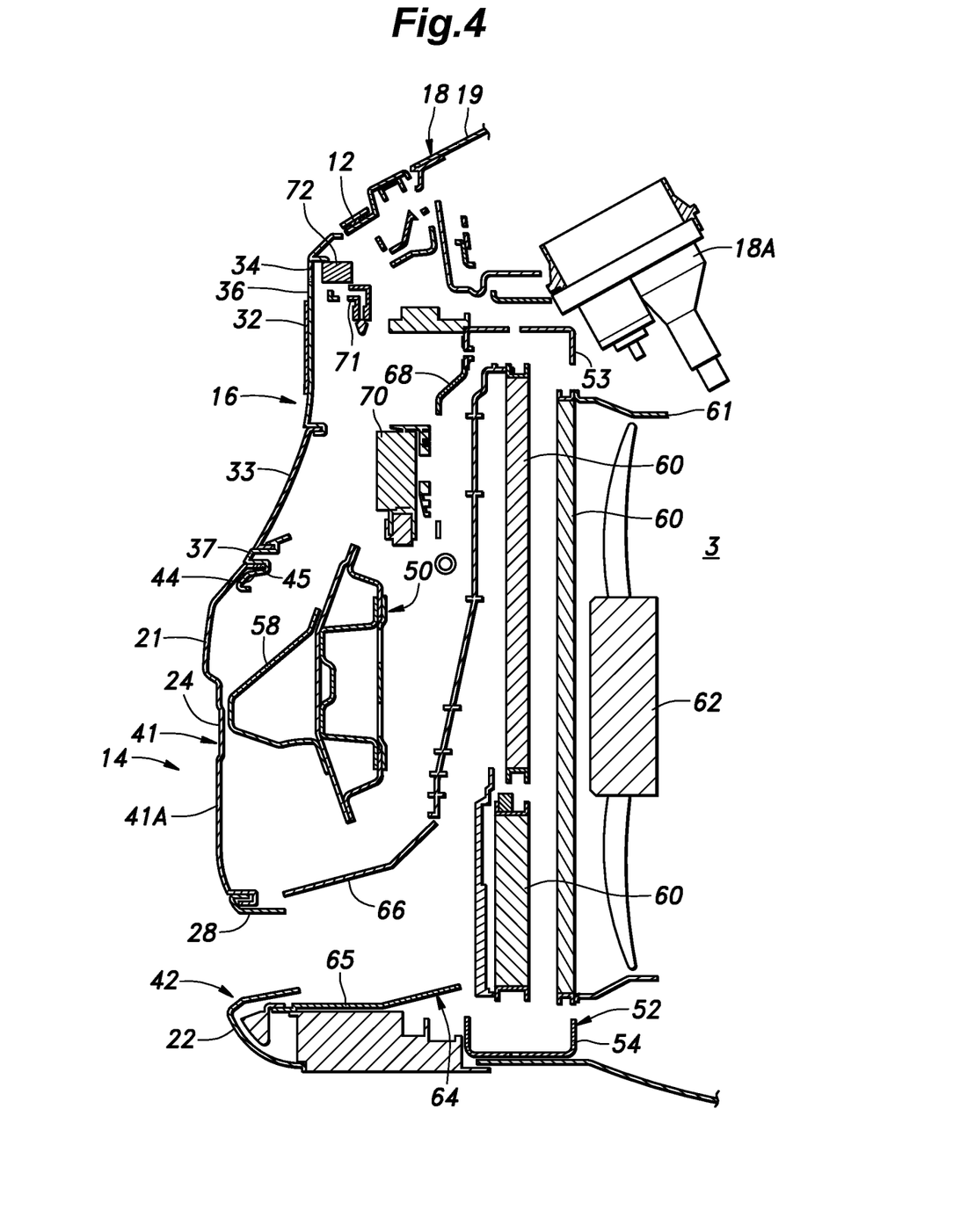
FIG. 4 is a sectional view taken along line IV-IV in FIG. 2.

FIG. 4 is a sectional view taken along line IV-IV in FIG. 2. As shown in FIGS. 3 and 4, the upper edge of the radio wave transmitting member 33 is located substantially at the boundary between the lower inclined surface 37 and the upper vertical surface 36 of the front panel 16, or at the lower edge of the upper vertical surface 36. The radio wave transmitting member 33 may have a different external appearance from the remaining part of the front panel 16, but because the upper edge of the radio wave transmitting member 33 coincides with the lower edge of the upper vertical surface 36 as discussed above, the radio wave transmitting member 33 becomes relatively less noticeable. In addition, since the emblem 32 that is relatively conspicuous is disposed in the part of the upper vertical surface 36 located between the light transmitting member 34 and the radio wave transmitting member 33, the light transmitting member 34 also becomes relatively less noticeable.

The lower edge of the front panel 16 is provided with a narrow groove 44 extending along the lower edge of the front panel 16 and having an open side facing forward (see FIG. 4). The upper edge of the upper face member 21 is provided a bumper mounting piece 45 (formed as a flange extending rearward), and is fitted into the narrow groove 44 of the front panel 16 in such a manner that the front surface of the front panel 16 is flush with the front surface of the upper face member 21, and the bumper mounting piece 45 is frictionally engaged by the narrow groove 44. Alternatively or additionally, claws or other positive engagement features may be used for the engagement between the bumper mounting piece 45 and the narrow groove 44.

The front surface of the upper face member 21 extends obliquely forward from the upper edge thereof so as to be continuous with the lower inclined surface 37, and then extends obliquely rearward in an intermediate part and a lower part thereof. Since the bottom surface 41A of the recess 41 extends substantially vertically, the amount of depression of the recess 41 (the amount of depression relative to a surrounding part of the upper face member 21) can be minimized.

The front bumper beam 50 extends laterally immediately behind the upper face member 21. In other words, the front bumper face 14 is positioned in front of the front bumper beam 50. A front bulkhead 52 which a structural member of the vehicle body 4 extends laterally behind the front bumper beam 50. The front bulkhead 52 includes an upper cross member 53, a lower cross member 54, and a pair of vertical members extending between the respect ends of the upper cross member 53 and the lower cross member 54 so as to define a rectangular frame structure in front view. The front bulkhead 52 is connected to the left and right front side members at the respective ends thereof. The front bumper beam 50 is attached to the front ends of the left and right front side members via extension members.

The front bumper beam 50 has a vertically elongated closed cross section. The front side of the front bumper beam 50 is provided with a safety plate 58 bent along a horizontal bend line so as to define a triangular cross sectional shape in cooperation with the front bumper beam 50. The safety plate 58 serves an energy absorbing member (pedestrian protecting member) that absorbs collision energy by collapsing upon collision with a pedestrian. The safety plate 58 is positioned rearward of the rear of the front bumper face 14 such that the front end of the safety plate 58 (corresponding to a vertex of the triangular cross sectional shape) is spaced from the rear face of the front bumper face 14. The front end of the safety plate 58 is disposed at a height corresponding to an upper part of the recess 41 formed in the upper face member 21.

A plurality of heat exchangers 60 are disposed inside the front bulkhead 52 (between the upper cross member 53 and the lower cross member 54). These heat exchangers 60 includes a heat exchanger for cooling an IPU (Intelligent Power Unit), a heat exchanger for cooling the coolant of an air conditioner, and so on. Heat sinks for heat emitting power circuits may also be considered as heat exchangers. Behind these heat exchangers 60 is provided a cooling fan 62 housed in a shroud 61. The heat exchangers 60 and the cooling fan 62 are supported by the front bulkhead 52. In front of the heat exchangers 60 is provided an air guide member 64 for guiding the external air introduced from the external air introduction opening 28 to the heat exchangers 60.

The air guide member 64 includes a lower wall 65 that extends generally horizontally rearward from a lower edge of the external air introduction opening 28, and an upper wall 66 that extends obliquely rearward and upward from an upper edge of the external air introduction opening 28. The air guide member 64 is thus aerodynamically configured such that the external air introduced from the external air introduction opening 28 is favorably guided toward the heat exchangers 60. The front end of the air guide member 64 is located rearward of the front end of the safety plate 58. Owing to the presence of the air guide member 64, even though the external air introduction opening 28 is positioned in the lower part of the vehicle body in an inconspicuous manner, the air guide member 64 allows a sufficient amount of external air to be supplied to the heat exchangers 60. Thereby, an external appearance can be enhanced, and the cooling performance of the heat exchangers 60 is ensured at the same time.

The upper cross member 53 of the front bulkhead 52 supports a device main body 18A of the port device 18 which is incorporated with a plurality of electric connectors, and positioned above the above the heat exchangers 60. Further, a radar device 70 is supported by the upper cross member 53 via a support member 68 so as to be positioned between the upper cross member 53 and the front bumper beam 50. The radar device 70 faces the radio wave transmitting member 33 in a spaced apart relationship, and emits and receives millimeter radio wave through the radio wave transmitting member 33 to detect objects located in front of the vehicle in a per se known manner. The radio wave transmitting member 33 is located on the lower inclined surface 37, but is able to detect objects in front of the vehicle without any problem. Owing to the inclination of the lower inclined surface 37, foreign matters such as rainwater and snow that may deposit on the front surface of the radio wave transmitting member 33 can be quickly blown off, and the impairment of the performance of the radar device 70 can be avoided. For this reason, it is more advantageous to provide the radio wave transmitting member 33 on the lower inclined surface 37 than on the upper vertical surface 36.

An image capturing device 72 which may consist of a multi-view camera is supported by a mount portion 71 integrally formed on the rear side of an upper part of the front panel 16 so as to face the light transmitting member 34 from the rear in a spaced apart relationship. The image capturing device 72 has a field of view directed not only forward but also downward so that the road surface immediately under the front end of the vehicle may be viewed. This is made possible because the light transmitting member 34 is provided on the upper vertical surface 36 of the front panel 16.

Thus, the radar device 70 is disposed rearward of the radio wave transmitting member 33 disposed on the lower inclined surface 37, and the image capturing device 72 is disposed rearward of the light transmitting member 34 disposed on the upper vertical surface 36. Owing to the presence of the lower inclined surface 37, the radar device 70 and the image capturing device 72 are protected from any damage at the time of a light frontal collision.

A large part of the front bumper face 14 is positioned in front of the front end of the safety plate 58, and so is the bottom surface 41A of the recess 41 forming the license plate mounting surface. On the other hand, the upper end of the front bumper face 14 and the lower end of the front panel 16 are located rearward of the bottom surface 41A of the recess 41 forming the license plate mounting surface, and the front end of the safety plate 58. In particular, the entire front panel 16 including the radio wave transmitting member 33 is located rearward of the bottom surface 41A of the recess 41 forming the license plate mounting surface, and the front end of the safety plate 58.

Therefore, at the time of a light frontal collision, the impact is first absorbed by the license plate mounting surface, and then absorbed by the safety plate 58. Therefore, the deformation or detachment of the front panel 16 can be prevented. Also, deformation or detachment of the radio wave transmitting member 33 can be prevented.

As described above, the front end of the air guide member 64 is also positioned generally rearward of the front end of the safety plate 58. Therefore, the deformation of the air guide member 64 at the time of a light frontal collision is also prevented, and the deformation of the component parts connected to the air guide member 64 is also prevented.

Figure 5:
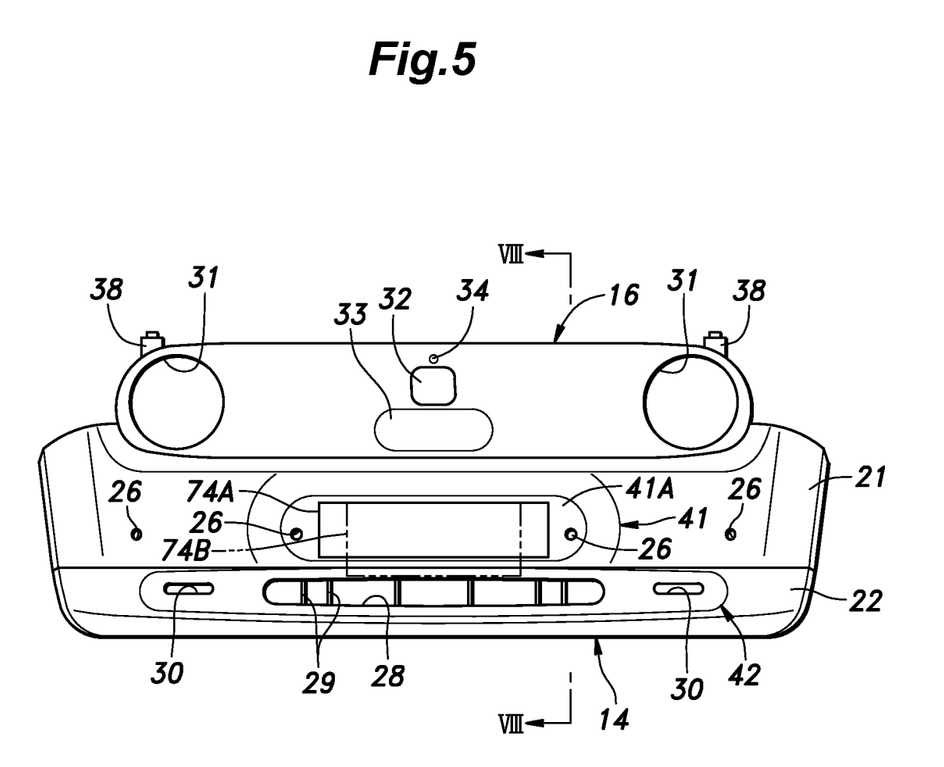
FIG. 5 is a front view of the front panel and the front bumper face with a license plate attached to the front bumper face.

FIG. 5 is a front view of the front bumper face 14 with a license plate attached thereto. As shown in FIG. 5, the license plate 74 (74A, 74B) is attached to the upper face member 21 with its upper end aligned with the license plate mounting portion 24 (FIG. 2). The license plate 74 varies in size and shape from country to country. Vertically wide and laterally short rectangular ones are used in Japan (hereinafter referred to as a short license plate 74B), and vertically narrow and laterally elongated ones are used in Europe (hereinafter referred to as a long license plate 74A). In FIG. 5, a long license plate 74A is indicated by solid lines, and a short license plate 74B is indicated by imaginary lines.

Figure 6A:
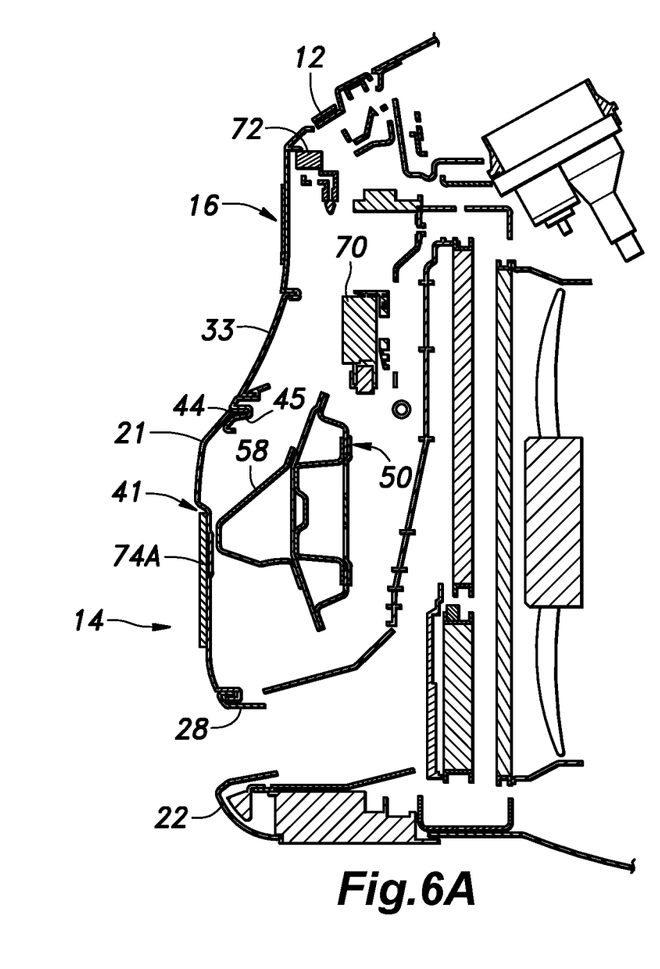
FIG. 6A is a sectional view similar to FIG. 4 with a long license plate attached to the front bumper face.
Figure 6B:
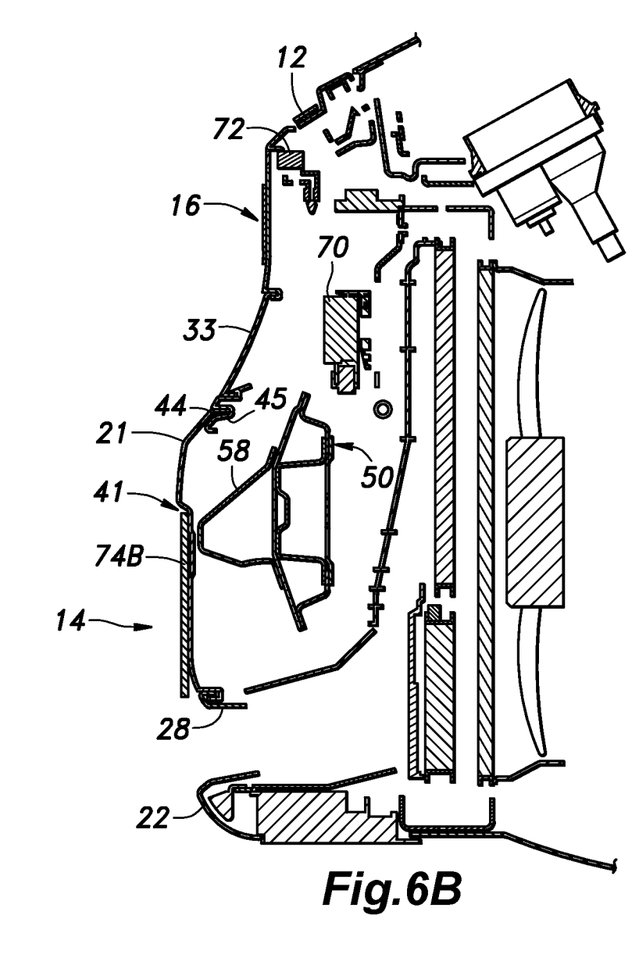
FIG. 6B is a sectional view similar to FIG. 4 with a short license plate attached to the front bumper face.

FIGS. 6A and 6B are views similar to FIG. 4 with the long license plate 74A attached to the front bumper face 14 and with the short license plate 74B attached to the front bumper face 14, respectively. As shown in FIGS. 5 and 6A, the bottom surface 41A of the recess 41 in the upper face member 21 has a width and height greater than the width and height of the long license plate 74A. Since the license plate mounting portion 24 is provided in an upper part of the bottom surface 41A of the recess 41, the lower end of the long license plate 74A is located above the lower end of the bottom surface 41A of the recess 41. Since the license plate mounting portion 24 is formed in the recess 41, and the long license plate 74A can be attached to the upper face member 21 so as to be accommodated in the recess 41, a favorable external appearance can be achieved.

On the other hand, the lower end of the short license plate 74B is located below the lower end of the bottom surface 41A of the recess 41 as shown in FIGS. 5 and 6B. Specifically, the lower end of the short license plate 74B overlaps with the lower face member 22, and is located above the upper end of the external air introduction opening 28. As discussed above, the step defined by the recess 41 in relation to the surrounding part of the upper face member 21 is smaller in the lower part of the recess 41 than in the upper part of the recess 41. Therefore, the short license plate 74B can be attached to the recess 41 in such a manner that the lower end of the short license plate 74B extends downward beyond the lower end of the recess 41 without creating any problem.

The two sensor mounting holes 26 provided on the bottom surface 41A of the recess 41 are disposed on either laterally outer side of the license plate 74, and close to the license plate 74 without overlapping with the license plate 74 in front view. By being positioned in the recess 41, the sensor mounting holes 26 are prevented from being noticeable.

Figure 7:
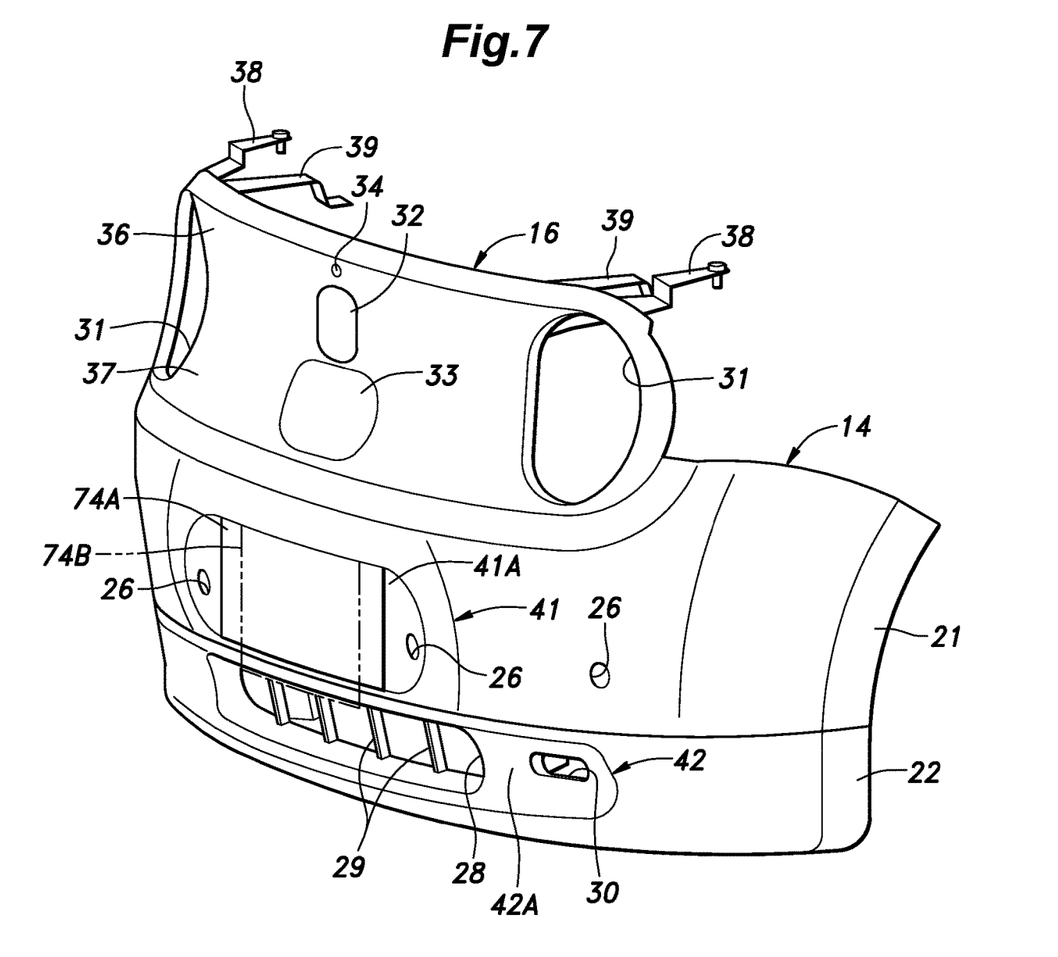
FIG. 7 is a view similar to FIG. 3 with a license plate attached to the front bumper face.

FIG. 7 is a perspective view of the front bumper face 14 and the front panel 16 with a license plate attached thereto. In FIG. 7, the long license plate 74A is indicated by solid lines, and the short license plate 74B is indicated by imaginary lines, similarly as in FIG. 5. As discussed above, since the lower end of the license plate 74 is located above the upper end of the external air introduction opening 28, the license plate does not obstruct the flow of air into the external air introduction opening 28. Therefore, the license plate does not impair the performance of the external air introduction opening 28 to introduce air when the vehicle is traveling.

The present invention has been described in terms of a specific embodiment, but the present invention can be modified in various ways without being limited by the embodiment. For instance, the present invention is applicable not only to electric vehicles but also to hybrid vehicles and more conventional vehicles powered by internal combustion engines. In the foregoing embodiment, the front panel 16 was formed as a separate member from the front bumper face 14, but may also be formed integrally with the front bumper face 14, in particular the upper face member 21 thereof.

In addition, specific configurations, arrangements, quantities, materials, and the like of the respective members and portions can be appropriately changed without departing from the scope of the present invention. The components included in the above embodiment are not necessarily essential, and at least some of them can be omitted and/or substituted without departing from the spirit of the present invention.

The invention claimed is:

1. A vehicle body front structure, comprising:
a front bumper beam;
a front bumper face positioned in front of the front bumper beam; and
an ornamental front panel located above the front bumper face,
wherein the front panel includes at least a substantially vertically extending vertical surface and an inclined surface continuous with the vertical surface on an external side thereof,
the inclined surface is provided with a radio wave transmitting member configured to transmit radio waves, a radar device being positioned behind the radio wave transmitting member,
the vertical surface is positioned in an upper part of the front panel, and the inclined surface angles forward from a lower edge of the vertical surface toward a lower edge of the front panel,
a light transmitting member is positioned in the vertical surface to transmit light, an image capturing device being positioned behind the light transmitting member.

2. The vehicle body front structure according to claim 1, wherein an upper edge of the radio wave transmitting member is located at the lower edge of the vertical surface.

3. The vehicle body front structure according to claim 1, wherein a part of the vertical surface located between the light transmitting member and the radio wave transmitting member is fitted with an emblem.

4. The vehicle body front structure according to claim 1, further comprising a safety plate attached to a front side of the front bumper beam, and positioned behind the front bumper face to absorb an impact of a frontal collision, and the lower edge of the front panel is positioned rearward of a front end of the safety plate.

5. The vehicle body front structure according to claim 4, wherein a lower edge of the radio wave transmitting member is positioned rearward of the front end of the safety plate.

6. The vehicle body front structure according to claim 4, wherein an external air introduction opening is defined in the front bumper face, the vehicle body front structure further comprising a heat exchanger positioned rearward of the front bumper beam, and an air guide member configured to conduct external air introduced from the external air introduction opening to the heat exchanger.

7. The vehicle body front structure according to claim 6, wherein the front bumper face is provided with a license plate mounting portion,
the vehicle body front structure further comprises a license plate mounted to the license plate mounting portion, and a lower edge of the license plate mounted to the license plate mounting portion is located above an upper edge of the external air introduction opening.

8. The vehicle body front structure according to claim 6, wherein a front end of the air guide member is located rearward of a front end of the safety plate.

9. The vehicle body front structure according to claim 1, wherein a license plate mounting surface is provided on the front bumper face, and a lower edge of the front panel is located rearward of the license plate mounting surface.

* * * * *